United States Patent
Kaneda et al.

(10) Patent No.: US 11,029,894 B2
(45) Date of Patent: Jun. 8, 2021

(54) IMAGE FORMING SYSTEM CAPABLE OF REDUCING PROCESSING LOAD OF PRINT SERVER, SERVER SYSTEM, METHOD OF CONTROLLING IMAGE FORMING SYSTEM, AND STORAGE MEDIUM

(71) Applicant: CANON KABUSHIKI KAISHA, Tokyo (JP)

(72) Inventors: Takeshi Kaneda, Funabashi (JP); Masaki Kashiwagi, Hiratsuka (JP); Akinori Takeo, Yokohama (JP); Jun Miyajima, Toride (JP); Seijiro Imai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/657,072

(22) Filed: Oct. 18, 2019

(65) Prior Publication Data
US 2020/0133591 A1 Apr. 30, 2020

(30) Foreign Application Priority Data
Oct. 25, 2018 (JP) .............................. JP2018-200949

(51) Int. Cl.
G06F 3/12 (2006.01)
H04L 29/08 (2006.01)

(52) U.S. Cl.
CPC .......... *G06F 3/1204* (2013.01); *G06F 3/1232* (2013.01); *G06F 3/1257* (2013.01);
(Continued)

(58) Field of Classification Search
CPC .... G06F 3/1204; G06F 3/1257; G06F 3/1273; G06F 3/1232; G06F 3/1292; G06F 3/1288; H04L 67/02
(Continued)

(56) References Cited

U.S. PATENT DOCUMENTS 8,711,371 B2 * 4/2014 Okada ................ G06K 15/1884
358/1.12
2006/0215181 A1 * 9/2006 Sugimoto ............... G06F 3/125
358/1.1
(Continued)

OTHER PUBLICATIONS

"IPP Shared Infrastructure Extensions" The Printer Working Group. Jun. 19, 2015: 1-91. Cited in the specification.

*Primary Examiner* — Allen H Nguyen
(74) *Attorney, Agent, or Firm* — Rossi, Kimms & McDowell LLP

(57) ABSTRACT

An image forming system capable of reducing the processing load of a print server. An information processing apparatus generates execution data for causing an image forming process to be executed. The print server holds the execution data acquired from the apparatus. A plurality of printers execute the image forming process based on the execution data. Print settings are set based on capability information of the printers and are transmitted to the apparatus. The information processing apparatus generates the execution data based on the received print settings. History information indicating one of the plurality of printers, which is used for printing, is managed, and the print settings are set based on capability information of one of the printers, which is selected based on the history information.

13 Claims, 17 Drawing Sheets

(52) U.S. Cl.
CPC .......... G06F 3/1273 (2013.01); *G06F 3/1288* (2013.01); *G06F 3/1292* (2013.01); *H04L 67/02* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2013/0044353 A1* | 2/2013 | Katano | G06F 3/1229 358/1.15 |
| 2013/0063776 A1* | 3/2013 | Kishida | G06F 3/1288 358/1.15 |
| 2015/0103367 A1* | 4/2015 | Tsujita | H04N 1/3871 358/1.13 |
| 2016/0239242 A1* | 8/2016 | Yamada | G06F 3/1289 |
| 2019/0065127 A1* | 2/2019 | Wagatsuma | G03G 15/6555 |

* cited by examiner

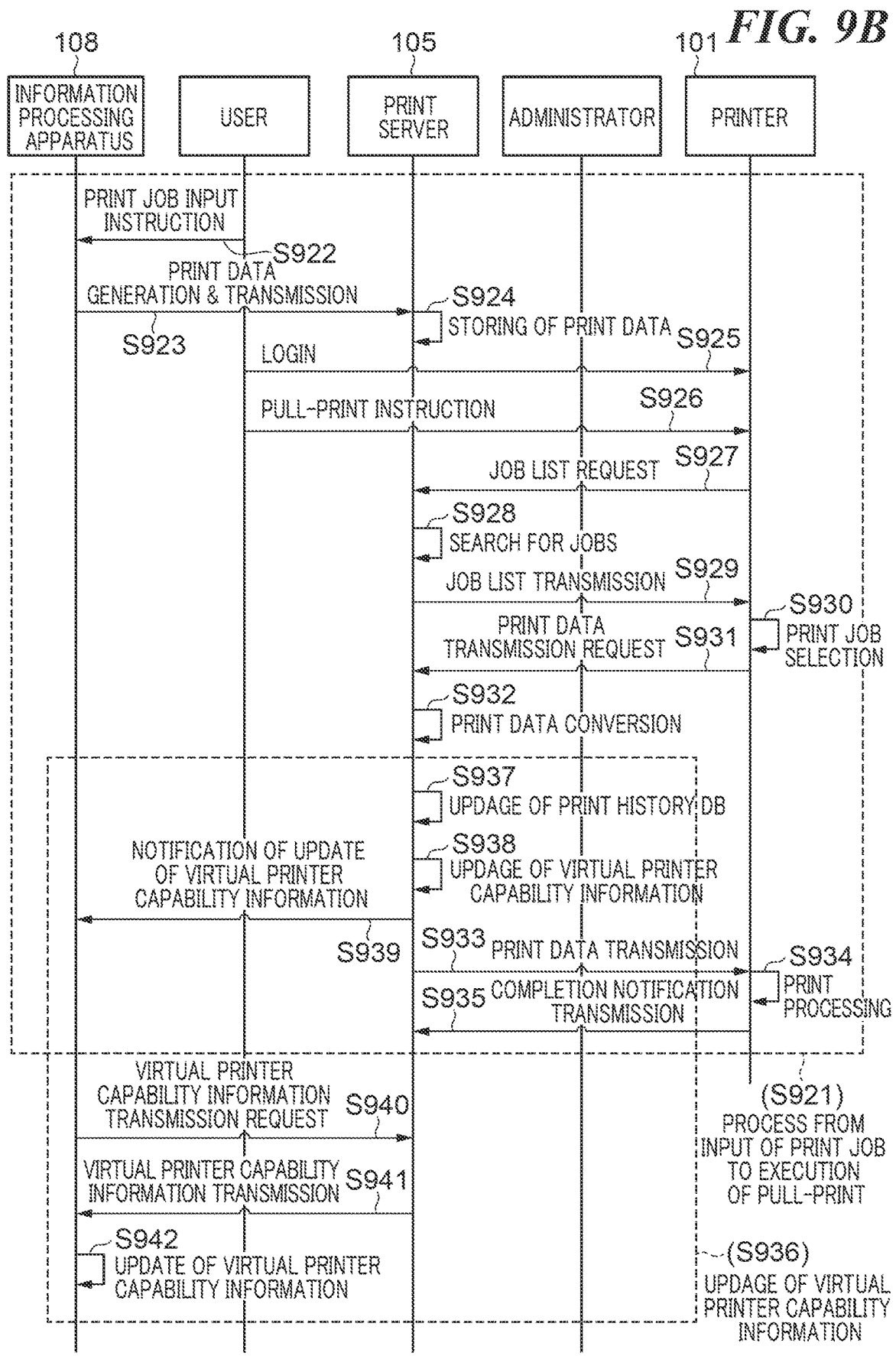

| INFORMATION ON SHEET FEEDING OF PRINTER 101 (IJ-A3-001) | | | |
|---|---|---|---|
| SHEET SIZE | SHEET TYPE | SHEET-FEEDING DIRECTION | ROTATION |
| A3 | — | ShortEdgeFeed | FALSE |
| A4 | — | LongEdgeFeed | FALSE |
| A5 | — | LongEdgeFeed | FALSE |
| A6 | — | ShortEdgeFeed | FALSE |
| POSTCARD | POSTCARD | LongEdgeFeed | FALSE |
| ENVELOPE | ENVELOPE | ShortEdgeFeed | FALSE |

| INFORMATION ON SHEET FEEDING OF PRINTER 103 (IJ-A4-002) | | | |
|---|---|---|---|
| SHEET SIZE | SHEET TYPE | SHEET-FEEDING DIRECTION | ROTATION |
| A4 | — | ShortEdgeFeed | FALSE |
| A5 | — | ShortEdgeFeed | FALSE |

FIG. 11A

```
"Hypertext Transfer Protocol"
  POST /ipp-proxy/print HTTPS/1.1/
  Content-Length : XXX
  Content-Type : application/ipp
  Host : <ipp-proxy.ip-v4/v6.addr>:631

User-Agent : IPP-Infra-Server

Expect : 100-continue

"Internet Printing Protocol"
  Request = (
    operation-id: Get-Printer-Attributes operation-attributes-tag = {
        "attributes-charset" = "utf-8";
        "attributes-natural-language" = ja-jp;
        "printer-uri" = "ipps://<ipp-proxy.ip-v4/v6.addr>:631/ipp-proxy/print";

"requested-attributes : 'feed-orientation-supported', 'feed-orientation-default'"
    }
  )
```

```
"Hypertext Transport Protocol"
  HTTPS/1.1 200 OK
  Server : IPP Proxy
  Content-Length : XXX
  Content-Type : application/ipp
  Connection : close "Internet Printing Protocol"
  Response = (
    operation-attributes-tag {
        "attributes-charset" = "utf-8";
        "attributes-natural-language" = "ja-jp";
    },
    printer-attributes-tag {
        feed-orientation-supported={
            short-edge-first,
            iso-a4-long-edge-first,
            iso-a5-long-edge-first,
        }
    }
    end-of-attribute-tag
  )
```

| PRINTER | SHEET SIZE | SHEET TYPE | SHEET-FEEDING DIRECTION | USER | NUMBER OF TIMES OF ACTUAL PRINTING | IMMEDIATELY PRECEDING USE |
|---|---|---|---|---|---|---|
| IJ-A3-001 | A4 | PLAIN PAPER | LongEdgeFeed | kaneda | 30 | T |
| IJ-A3-001 | A3 | PLAIN PAPER | ShortEdgeFeed | kaneda | 25 | — |
| IJ-A3-001 | POSTCARD | POSTCARD | LongEdgeFeed | kaneda | 29 | — |
| IJ-A3-001 | ENVELOPE | ENVELOPE | ShortEdgeFeed | kaneda | 10 | F |
| IJ-A4-002 | A4 | RECYCLED PAPER | ShortEdgeFeed | kaneda | 80 | F |
| IJ-A4-002 | A4 | RECYCLED PAPER | ShortEdgeFeed | yamada | 224 | F |
| IJ-A4-002 | A4 | PLAIN PAPER | ShortEdgeFeed | yamada | 56 | F |

| PRINTER | USER | NUMBER OF TIMES OF ACTUAL PRINTING | IMMEDIATELY PRECEDING USE |
|---|---|---|---|
| IJ-A3-001 | kaneda | 94 | T |
| IJ-A4-002 | kaneda | 80 | F |
| IJ-A3-001 | yamada | 0 | F |
| IJ-A4-002 | yamada | 280 | T |

```
"Hypertext Transfer Protocol"
  POST /ipp-infra/print HTTPS/1.1/
  Content-Length : XXX
  Content-Type : application/ipp
  Host : <ipp-infra.ip-v4/v6.addr>:632

User-Agent : IPP-Client

Expect : 100-continue

"Internet Printing Protocol"
  Request = (
    operation-id: Get-Printer-Attributes operation-attributes-tag = {
        "attributes-charset" = "utf-8";
        "attributes-natural-language" = ja-jp;
        "printer-uri" = "ipps://<ipp-infra.ip-v4/v6.addr>:632/ipp-infra/print";
        "requested-attributes : 'feed-orientation-supported', 'feed-orientation-default"      1302
    }
  )
```

FIG. 13B
1303

```
"Hypertext Transport Protocol"
  HTTPS/1.1 200 OK
  Server : IPP Infra Server
  Content-Length : XXX
  Content-Type : application/ipp
  Connection : close "Internet Printing Protocol"
  Response = (
    operation-attributes-tag {
        "attributes-charset" = "utf-8";
        "attributes-natural-language" = "ja-jp";
    },
    printer-attributes-tag {
        feed-orientation-supported={          1304
            short-edge-first,
            iso-a4-long-edge-first,
            iso-a5-long-edge-first,
        }
    }
    end-of-attribute-tag
  )
```

| SHEET SIZE | SHEET TYPE | SHEET-FEEDING DIRECTION | ROTATION |
|---|---|---|---|
| A3 | — | | FALSE |
| A4 | — | | FALSE |
| A5 | — | | FALSE |
| A6 | — | | FALSE |
| POSTCARD | POSTCARD | | FALSE |
| ENVELOPE | ENVELOPE | | FALSE |

| SHEET SIZE | SHEET TYPE | SHEET-FEEDING DIRECTION | ROTATION |
|---|---|---|---|
| A3 | — | ShortEdgeFeed | FALSE |
| A4 | — | | FALSE |
| A5 | — | | FALSE |
| A6 | — | ShortEdgeFeed | FALSE |
| POSTCARD | POSTCARD | LongEdgeFeed | FALSE |
| ENVELOPE | ENVELOPE | ShortEdgeFeed | FALSE |

| SHEET SIZE | SHEET TYPE | SHEET-FEEDING DIRECTION | ROTATION |
|---|---|---|---|
| A3 | — | ShortEdgeFeed | FALSE |
| A4 | — | ShortEdgeFeed | FALSE |
| A5 | — | LongEdgeFeed | FALSE |
| A6 | — | ShortEdgeFeed | FALSE |
| POSTCARD | POSTCARD | LongEdgeFeed | FALSE |
| ENVELOPE | ENVELOPE | ShortEdgeFeed | FALSE |

| SHEET SIZE | SHEET TYPE | SHEET-FEEDING DIRECTION | ROTATION |
|---|---|---|---|
| A3 | — | ShortEdgeFeed | FALSE |
| A4 | — | LongEdgeFeed | FALSE |
| A5 | — | LongEdgeFeed | FALSE |
| A6 | — | ShortEdgeFeed | FALSE |
| POSTCARD | POSTCARD | LongEdgeFeed | FALSE |
| ENVELOPE | ENVELOPE | ShortEdgeFeed | FALSE |

IMAGE FORMING SYSTEM CAPABLE OF REDUCING PROCESSING LOAD OF PRINT SERVER, SERVER SYSTEM, METHOD OF CONTROLLING IMAGE FORMING SYSTEM, AND STORAGE MEDIUM

BACKGROUND OF THE INVENTION

Field of the Invention

The present invention relates to an image forming system, a server system, a method of controlling the image forming system, and a storage medium.

Description of the Related Art

There is known an image forming system that provides a virtual print service. The image forming system includes an information processing apparatus, such as a mobile terminal, a print server in a cloud network, and a plurality of printers. These apparatuses perform data communication according to IPP (Internet Printing Protocol) (see e.g. 5100. 18-2015 IPP Shared Infrastructure Extensions, [searched on Oct. 22, 2018] (http://ftp.pwg.org/pub/pwg/candidates/cs-ippin-fra10-20150619-5100.18.pdf)). In the virtual print service, when the information processing apparatus receives an instruction for inputting a print job, given by a user, the information processing apparatus generates print data for executing the print job based on print settings information set by the user, and the print server stores the generated print data. Further, when the user gives a pull-print instruction from one printer of the plurality of printers registered in the print server, which is closest to the user, the print server transmits the stored print data to the one printer, and the one printer performs printing based on the received print data. By using the above-mentioned virtual print service, the user can easily obtain a print product from the closest printer without making connection settings, etc. of a printer used e.g. in an office under a free address environment.

The information processing apparatus acquires specifications of each printer, such as a sheet-feeding direction, from the print server, when the information processing apparatus has received an instruction for inputting a print job from a user, and generates print data based on the acquired specifications. For example, in a case where the sheet-feeding direction of one of two printers registered in the print server is a long edge direction, and the sheet-feeding direction of the other is a short edge direction, the information processing apparatus generates print data so as to generate an image in an orientation suitable for the sheet-feeding direction of the one printer (long edge direction). When the other printer receives a pull-print instruction of this print data, the print server or the other printer performs conversion processing for compensation of a difference in the specifications, more specifically, conversion processing for converting the orientation of image generation to the orientation suitable for the sheet-feeding direction of the other printer (short edge direction). Here, out of the print server and the printer, the print server is concentratedly accessed by a plurality of information processing apparatuses and other printers, and hence, from a viewpoint of reduction of the processing load of the print server, it is preferable that the printer performs the conversion processing for compensating for the difference in the specifications.

However, in a case where the printer cannot perform the above-mentioned conversion processing for compensating for the difference in the specifications, the conversion processing is performed by the print server, which increases the processing load of the print server.

SUMMARY OF THE INVENTION

The present invention provides an image forming system that is capable of reducing the processing load of a print server, a server system, a method of controlling the image forming system a method of controlling the same, and a storage medium.

In a first aspect of the present invention, there is provided an image forming system including an information processing apparatus that generates execution data for causing an image forming process to be executed, a server that holds execution data acquired from the information processing apparatus, and a plurality of image forming apparatuses that execute the image forming process based on the execution data, comprising a setting unit configured to set print settings based on capability information of the plurality of image forming apparatuses, which is acquired from the plurality of image forming apparatuses, a transmission unit configured to transmit the print settings set by the setting unit to the information processing apparatus, and a management unit configured to manage history information indicating one of the plurality of image forming apparatuses, which was used for printing, wherein the information processing apparatus generates the execution data based on the print settings transmitted by the transmission unit, and wherein the setting unit sets the print settings based on capability information of one of the plurality of image forming apparatuses, which is selected based on the history information managed by the management unit.

In a second aspect of the present invention, there is provided a server system that is capable of communicating with a plurality of image forming apparatuses and an information processing apparatus, comprising an acquisition unit configured to acquire capability information of the plurality of image forming apparatuses, a setting unit configured to set print settings based on capability information of the plurality of image forming apparatuses, which is acquired by the acquisition unit, a transmission unit configured to transmit the print settings set by the setting unit to the information processing apparatus, a management unit configured to manage information indicating one of the plurality of image forming apparatuses, which was used for printing, as history information, and a selection unit configured to select an image forming apparatus based on the history information managed by the management unit, wherein the setting unit sets the print settings based on capability information of an image forming apparatus selected by the selection unit.

In a third aspect of the present invention, there is provided a method of controlling an image forming system including an information processing apparatus that generates execution data for causing an image forming process to be executed, a server that holds execution data acquired from the information processing apparatus, and a plurality of image forming apparatuses that execute the image forming process based on the execution data, comprising setting print settings based on capability information of the plurality of image forming apparatuses, which is acquired from the plurality of image forming apparatuses, transmitting the print settings to the information processing apparatus, and managing history information indicating one of the plurality of image forming apparatuses, which was used for printing, wherein the information processing apparatus generates the execution data based on the print settings, and wherein the print settings are generated based on capability information of one of the plurality of image forming apparatuses, which is selected based on the history information.

In a fourth aspect of the present invention, there is provided a non-transitory computer-readable storage medium storing a computer-executable program for executing a method of controlling an image forming system including an information processing apparatus that generates execution data for causing an image forming process to be executed, a server that holds execution data acquired from the information processing apparatus, and a plurality of image forming apparatuses that execute the image forming process based on the execution data, wherein the method comprises setting print settings based on capability information of the plurality of image forming apparatuses, which is acquired from the plurality of image forming apparatuses, transmitting the print settings to the information processing apparatus, and managing history information indicating one of the plurality of image forming apparatuses, which was used for printing, wherein the information processing apparatus generates the execution data based on the print settings, and wherein the print settings are generated based on capability information of one of the plurality of image forming apparatuses, which is selected based on the history information.

According to the present invention, it is possible to reduce the processing load of the print server.

Further features of the present invention will become apparent from the following description of exemplary embodiments (with reference to the attached drawings).

BRIEF DESCRIPTION OF THE DRAWINGS

FIG. 9B is a sequence diagram of the print control process performed by the image forming system shown in FIG. 1.

FIGS. 10A and 10B are diagrams showing respective examples of capability information of the printers appearing in FIG. 1.

FIGS. 11A and 11B are diagrams showing respective examples of data transmitted and received between the information processing apparatus and the print server appearing in FIG. 1.

FIGS. 12A and 12B are diagrams useful in explaining a print history database managed by a print history-storing section appearing in FIG. 6.

FIGS. 13A and 13B are diagrams each showing an example of data transmitted and received between the information processing apparatus and the print server, appearing in FIG. 1.

FIGS. 16A to 16D are diagrams useful in explaining how a sheet-feeding direction is set by a virtual printer in the present embodiment.

DESCRIPTION OF THE EMBODIMENTS

The present invention will now be described in detail below with reference to the accompanying drawings showing embodiments thereof.

Figure 1:
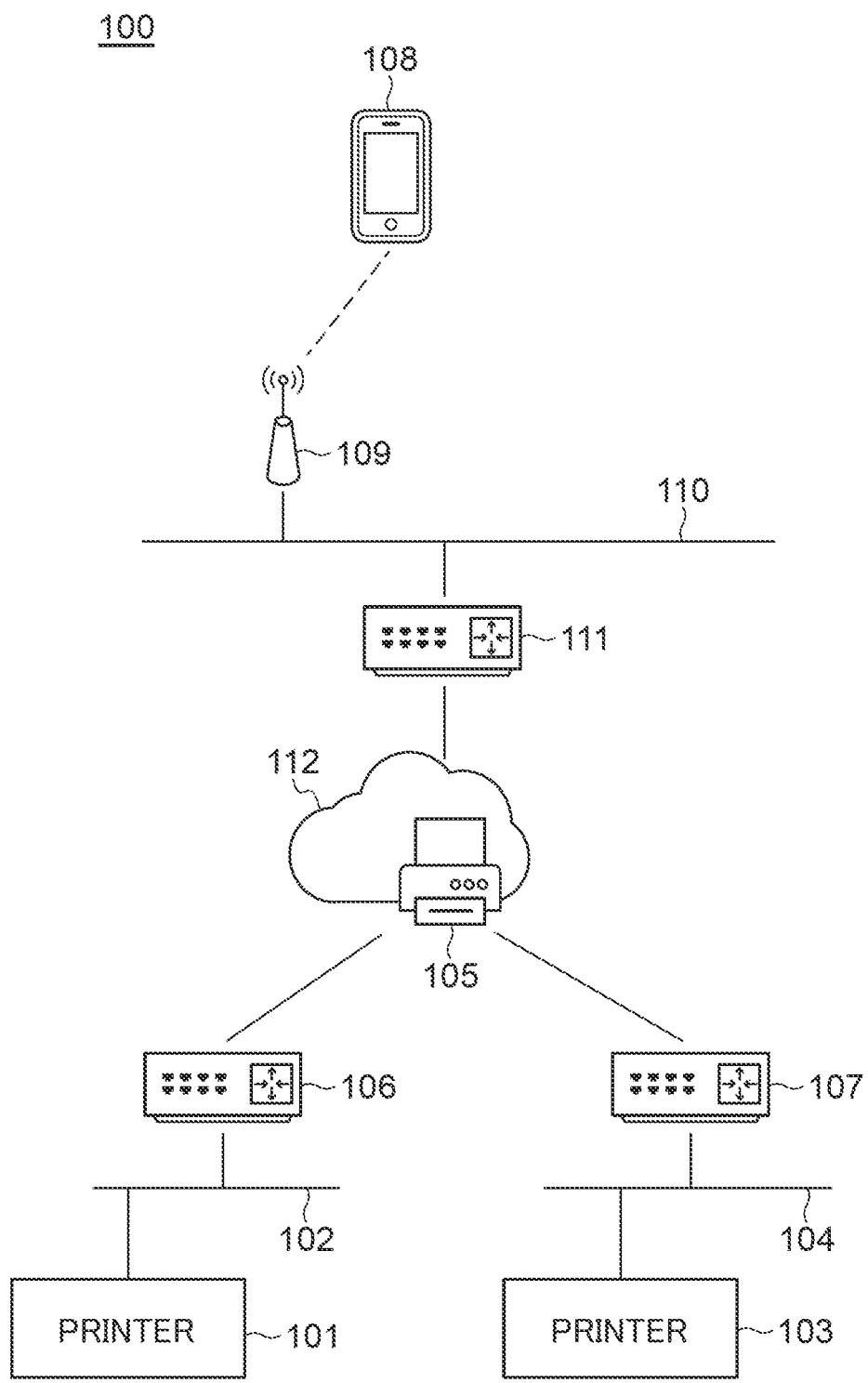
FIG. 1 is a network diagram schematically showing the configuration of an image forming system according to an embodiment of the present invention.

FIG. 1 is a network diagram schematically showing the configuration of an image forming system 100 according to an embodiment of the present invention. Referring to FIG. 1, the image forming system 100 includes printers 101 and 103 as image forming apparatuses, a print server 105, and an information processing apparatus 108. The image forming system 100 functions as a virtual printer that provides a virtual print service. The printer 101 performs data communication with an external apparatus as a component of a LAN (Local Area Network) 102. The printer 103 performs data communication with an external apparatus as a component of a LAN 104. The printers 101 and 103 are connected to the print server 105 in a cloud network via routers 106 and 107, respectively. The printers 101 and 103 have respective IP addresses assigned by the routers 106 and 107, which are to be designated by the print server 105 when performing communication. The information processing apparatus 108 is e.g. a mobile terminal, such as a tablet terminal or a smartphone, or a PC. The information processing apparatus 108 is connected to a LAN 110 via an access point 109 and is connected to the print server 105 via a router 111 and the Internet 112.

In the image forming system 100, when the information processing apparatus 108 receives an instruction for inputting a print job, provided by a user, the information processing apparatus 108 generates print data (execution data) for executing the print job based on print settings information set by the user. The information processing apparatus 108 transmits the generated print data to the print server 105, and the print server 105 stores the received print data. Further, when the user gives a pull-print instruction from the printer 101, as one closest to the user of the printers 101 and 103, the print server 105 transmits the stored print data to the printer 101 and the printer 101 performs an image forming process based on the received print data. Note that although in the present embodiment, the image forming system 100 configured as above is described by way of example, the configuration of the image forming system 100 is not limited to the above-described configuration. The image forming system 100 is only required to include one or more information processing apparatuses and one or more printers, all of which are communicably connected via the print server 105. Further, the LANs 102, 104, and 110 each may be either a wireless LAN or a wired LAN.

Next, the configuration of the printers 101 and 103 will be described. Note that in the present embodiment, the printers 101 and 103 have the same configuration, and hence the following description will be given of the configuration of the printer 101 by way of example.

Figure 2:
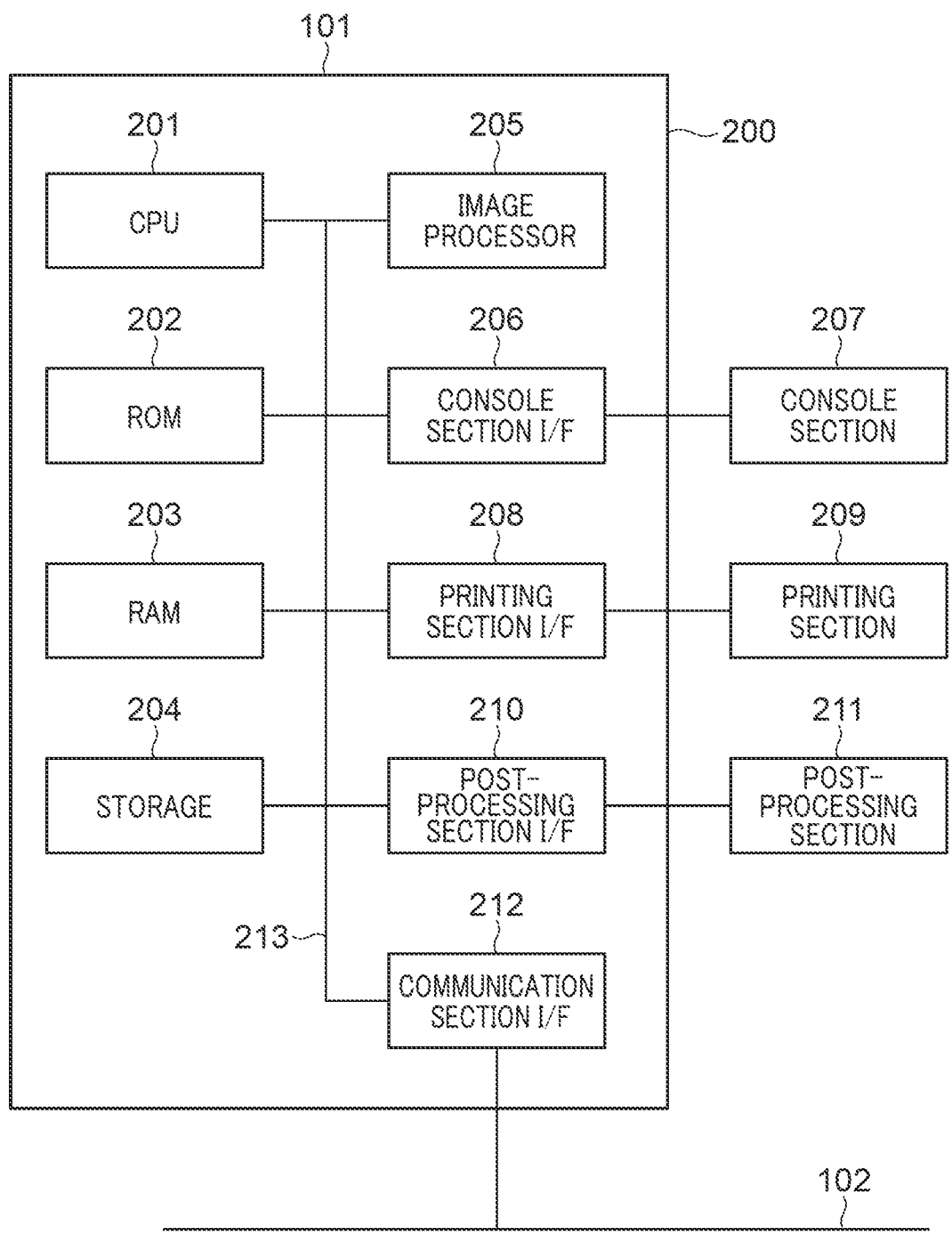
FIG. 2 is a block diagram schematically showing a hardware configuration of a printer appearing in FIG. 1.

FIG. 2 is a block diagram schematically showing a hardware configuration of the printer 101 appearing in FIG. 1. The printer 101 has a printing function for printing an image on a sheet. The printer 101 performs print processing based on print data received from the print server 105 in the cloud network. Note that in the present embodiment, the printer 101 may be an MFP (Multi-Function Peripheral) having not only the printing function, but also a scan function and a FAX function.

Referring to FIG. 2, the printer 101 includes a controller 200, a console section 207, a printing section 209, and a post-processing section 211. The controller 200 is connected to the console section 207, the printing section 209, and the post-processing section 211. Further, the controller 200 includes a CPU 201, a ROM 202, a RAM 203, a storage 204, an image processor 205, a console section interface 206, a printing section interface 208, a post-processing section interface 210, and a communication section interface 212. The CPU 201, the ROM 202, the RAM 203, the storage 204, the image processor 205, the console section interface 206, the printing section interface 208, the post-processing section interface 210, and the communication section interface 212 are interconnected via a system bus 213. Note that CPU is an abbreviation of Central Processing Unit, ROM is an abbreviation of Read Only Memory, and RAM is an abbreviation of Random Access Memory.

The controller 200 controls the overall operation of the printer 101. The CPU 201 performs various kinds of control, including print control and read control, by loading associated programs stored in the ROM 202 and the storage 204 into the RAM 203, and executing the loaded programs. The ROM 202 stores the control programs executed by the CPU 201, a boot program, and so forth. The RAM 203 is a main storage memory of the CPU 201. The RAM 203 is used as a work area for the CPU 201, and further used as a temporary storage area for loading the control programs. The storage 204 is a storage device, such as an HDD (Hard Disk Drive) and an SSD (Solid State Drive). The storage 204 stores print data, image data, programs, and settings information. Note that although in the present embodiment, one CPU 201 executes processing using one RAM 203, another form of processing may be employed. For example, the printer 101 may execute each processing by causing a plurality of CPUs, RAMs, ROMs, and storages to operate in cooperation. Further, the printer 101 may execute part of the processes using a hardware circuit, such as an ASIC or an FPGA. Note that ASIC is an abbreviation of Application Specific Integrated Circuit, and FPGA is an abbreviation of Field-Programmable Gate Array.

The image processor 205 has a RIP (Raster Image Processor) function for generating image data by rasterizing print data received from the print server 105. Further, the image processor 205 performs resolution conversion processing and correction processing on the image data. Note that although in the present embodiment, it is assumed that the image processor 205 is realized by a hardware circuit, such as an ASIC or an FPGA, this is not limitative. For example, the printer 101 may be further provided with a processor (not shown) for image processing, and this processor may realize image processing and processing for rasterizing data to print data by executing an image processing program.

The console section interface 206 is an interface for connecting the console section 207 to the controller 200. The console section 207 is comprised of a display section (not shown) having a touch panel function and a plurality of hard keys (not shown). The console section 207 displays settings information, etc. of the printer 101 on the display section, and further, receives instructions provided by a user. The printing section interface 208 is an interface for connecting the printing section 209 to the controller 200. When the printer 101 receives print data from the print server 105, the received print data is transferred from the controller 200 to the printing section 209. The printing section 209 prints an image on a sheet based on print data received from the controller 200. Note that the printing method used by the printing section 209 may be either an electrophotographic method or an inkjet method, and further, another method, such as a thermal transfer method, may be used.

The post-processing section interface 210 is an interface for connecting the post-processing section 211 to the controller 200. The post-processing section 211 performs post-processing on sheets printed by the printing section 209, based on a control command received from the controller 200. The communication section interface 212 performs data communication with the print server 105, etc., via the LAN 102. For example, the communication section interface 212 transmits image data to the print server 105 and also receives print data from the print server 105.

Figure 3:
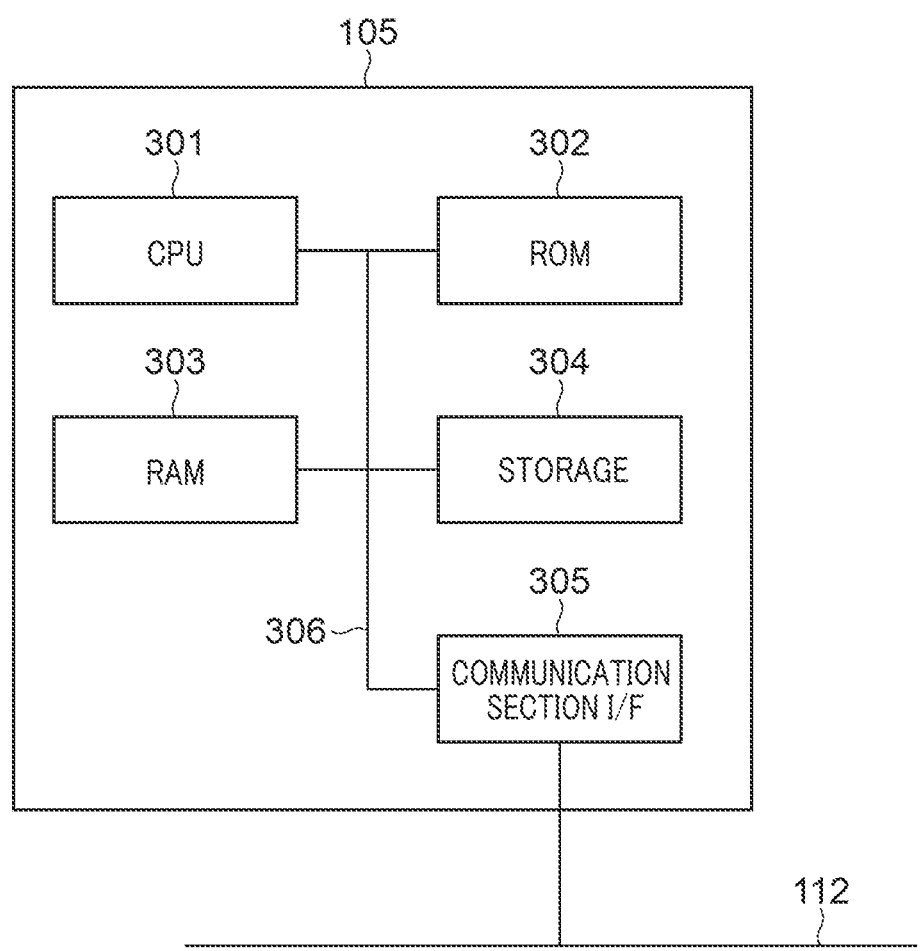
FIG. 3 is a block diagram schematically showing a hardware configuration of a print server appearing in FIG. 1.

FIG. 3 is a block diagram schematically showing a hardware configuration of the print server 105 appearing in FIG. 1. Referring to FIG. 3, the print server 105 includes a CPU 301, a ROM 302, a RAM 303, a storage 304, and a communication section interface 305. The CPU 301, the ROM 302, the RAM 303, the storage 304, and the communication section interface 305 are interconnected via a system bus 306. The CPU 301 performs various kinds of control, including control for transferring print data, by loading associated programs stored in the ROM 302 and the storage 304 into the RAM 303, and executing the loaded programs. The ROM 302 stores the control programs executed by the CPU 301, a boot program, and so forth. The RAM 303 is a main storage memory of the CPU 301. The RAM 303 is used as a work area for the CPU 301 and is further used as a temporary storage area for loading the control programs. The storage 304 is a storage device, such as an HDD or an SSD. The storage 304 stores an OS (operating system), print data stored in the cloud network, settings information of various cloud services, etc.

Figure 4:
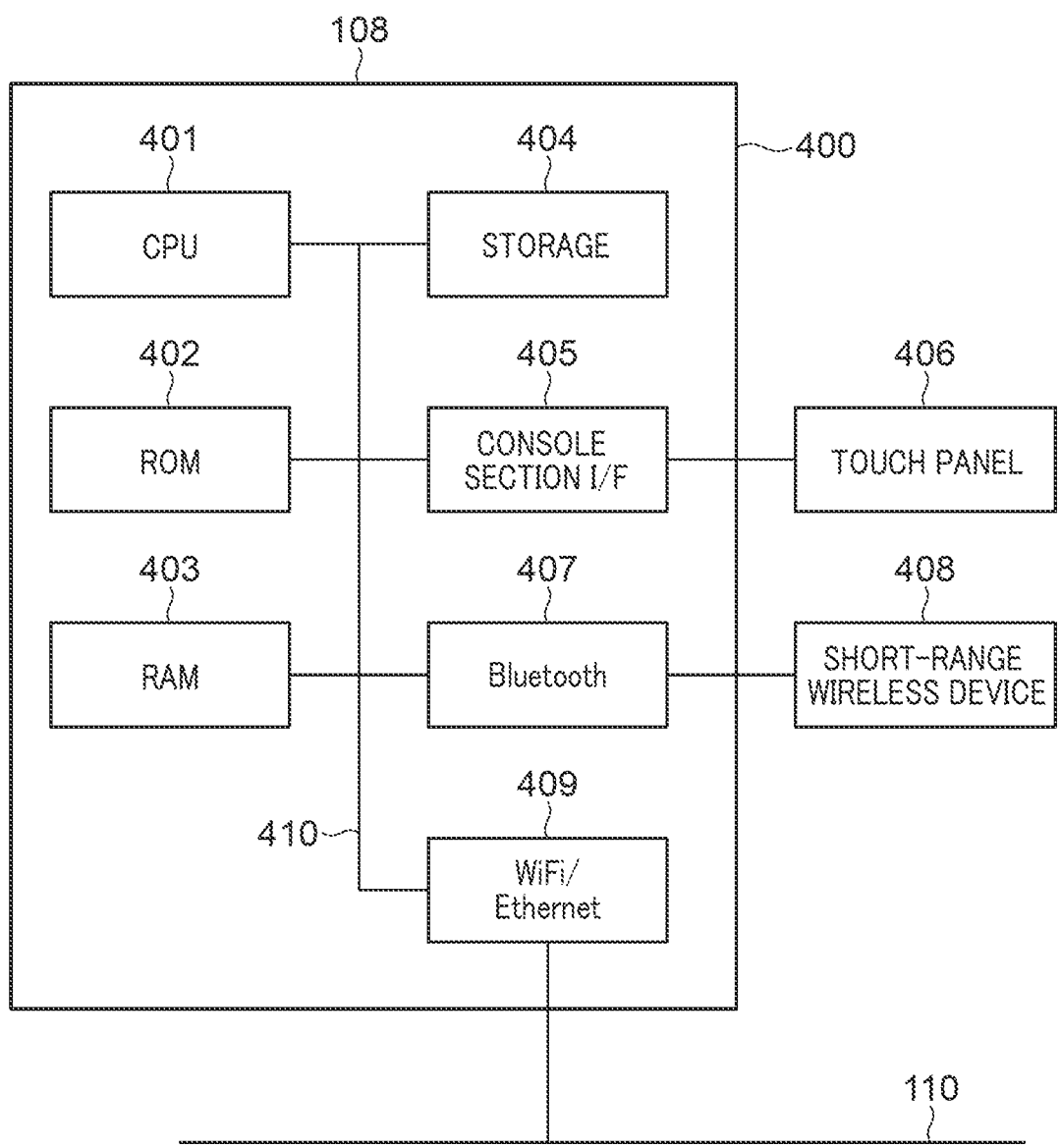
FIG. 4 is a block diagram schematically showing a hardware configuration of an information processing apparatus appearing in FIG. 1.

FIG. 4 is a block diagram schematically showing a hardware configuration of the information processing apparatus 108 appearing in FIG. 1. Referring to FIG. 4, the information processing apparatus 108 includes a controller 400 and a touch panel 406. The controller 400 is connected to the touch panel 406. The controller 400 includes a CPU 401, a ROM 402, a RAM 403, a storage 404, a console section interface 405, a Bluetooth (registered trademark) 407, and a Wi-Fi/Ethernet 409. The CPU 401, the ROM 402, the RAM 403, the storage 404, the console section interface 405, the Bluetooth 407, and the Wi-Fi/Ethernet 409 are interconnected via a system bus 410.

The controller 400 controls the overall operation of the information processing apparatus 108. The CPU 401 performs various kinds of control, including as print settings screen control and print data generation control, by loading associated programs stored in the ROM 402 and the storage 404 into the RAM 403, and executing the loaded programs. The ROM 402 stores the control programs executed by the CPU 401, a boot program, and so forth. The RAM 403 is a main storage memory of the CPU 401. The RAM 403 is used as a work area for the CPU 401 and is further used as a temporary storage area for loading the control programs. The storage 404 is a storage device, such as an HDD or an SSD. The storage 404 stores an OS, a print application, an OS printing framework, print data generated by the OS printing framework, and various settings information. The console section interface 405 is an interface for connecting the touch panel 406 to the controller 400. The touch panel 406 displays a setting screen for each application, a print settings screen, etc., and further notifies an application operating on the CPU 401 of a touch operation performed by a user. The Bluetooth 407 performs short-range wireless communication with short-range wireless devices 408 having a short-range wireless communication function, such as a mouse and a keyboard. The Wi-Fi/Ethernet 409 performs wireless communication via the access point 109 or wired communication with an external apparatus as a component of the LAN 110.

Figure 5:
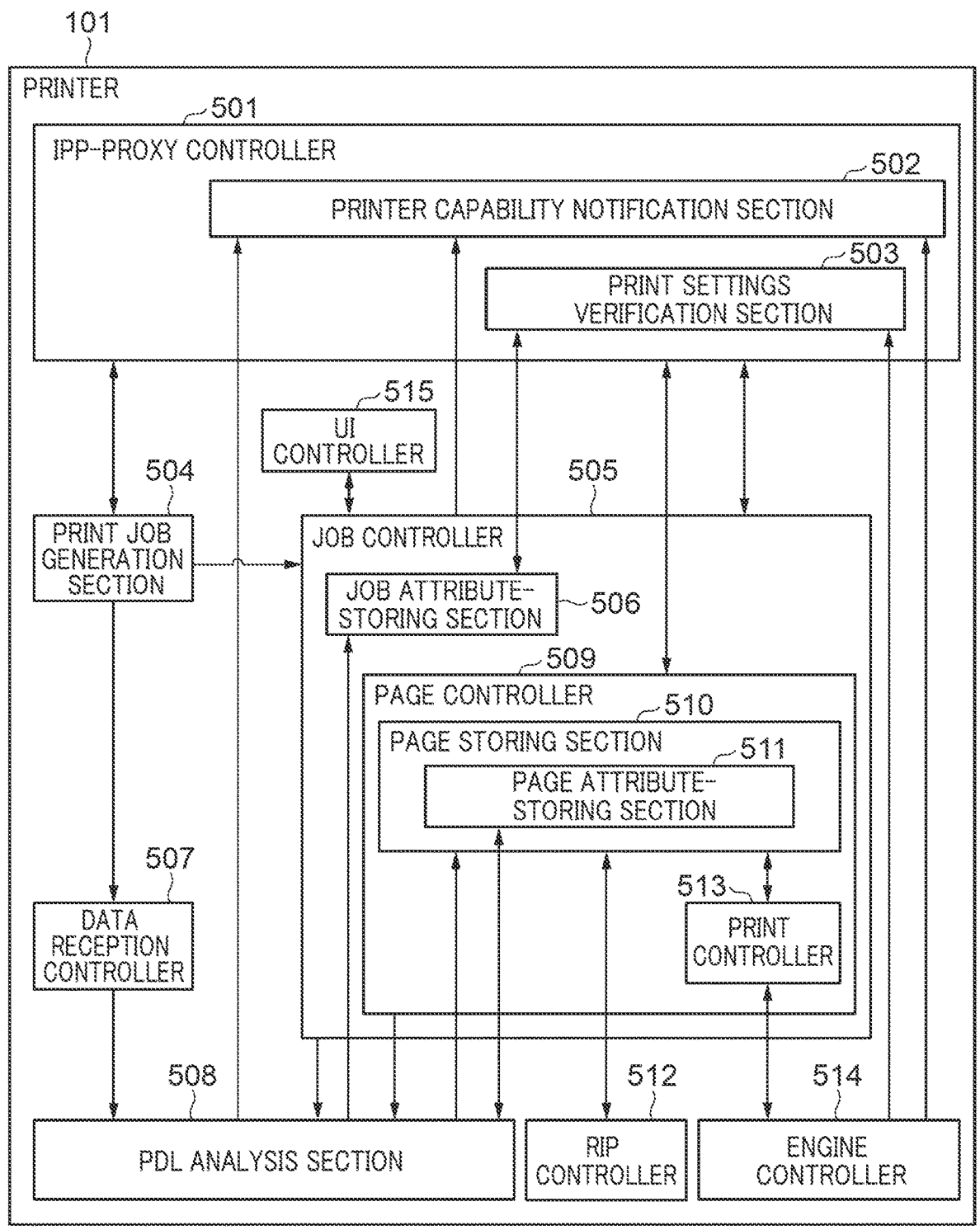
FIG. 5 is a block diagram schematically showing a software configuration of the printer appearing in FIG. 1.

FIG. 5 is a block diagram schematically showing a software configuration of the printer 101 appearing in FIG. 1. Referring to FIG. 5, the printer 101 includes, as modules, an IPP-Proxy controller 501, a printer capability notification section 502, a print settings verification section 503, a print job generation section 504, a job controller 505, and a job attribute-storing section 506. Further, the printer 101 includes, as modules, a data reception controller 507, a PDL analysis section 508, a page controller 509, a page storing section 510, a page attribute-storing section 511, a RIP controller 512, and a print controller 513. Furthermore, the printer 101 includes, as modules, an engine controller 514 and a user interface controller 515. Processing operations of the above-mentioned modules are performed by the CPU 201 executing associated programs loaded into the RAM 203.

The IPP-Proxy controller 501 is comprised of the printer capability notification section 502 and the print settings verification section 503. The printer capability notification section 502 notifies, upon receipt of an inquiry about the capabilities of the printer 101 from the print server 105, the print server 105 of capability information of the printer 101. The capability information of the printer 101 refers e.g. to information indicating whether or not the printer 101 can print the requested number of copies, information on formats supported by the printer 101, and information on a sheet-feeding direction.

Further, the IPP-Proxy controller 501 controls communication by IPP. For example, in a case where print data specified by IPP attributes is received from the print server 105, the IPP-Proxy controller 501 outputs the received print data to the job controller 505 via the print job generation section 504. The print settings verification section 503 verifies the attribute information of the print data and writes a result of the verification into the job attribute-storing section 506. As a result of the verification, for example, the number of copies to be printed, information concerning finishing, and PDL format information are written into the job attribute-storing section 506.

Further, the IPP-Proxy controller 501 outputs drawing data generated based on the print data to the data reception controller 507. The data reception controller 507 is a buffer area for storing the print data received by the print job generation section 504 and temporarily stores the drawing data in the storage 204 for each print job.

The PDL analysis section 508 supports a PWG-Raster format. The PDL analysis section 508 acquires drawing data from the data reception controller 507 according to an instruction received from the job controller 505, and analyzes the received drawing data to thereby generate page data of each of pages forming the drawing data. The page controller 509 stores image information included in the page data generated by the PDL analysis section 508 in the page storing section 510 and further stores page attribute information included in the page data in the page attribute-storing section 511. The page controller 509 controls page analysis processing performed by the PDL analysis section 508, RIP processing performed by the RIP controller 512, and print control processing performed by the print controller 513.

The print controller 513 decomposes the image data acquired from the page storing section 510, which has been subjected to the RIP processing, into RGB color data, and transfers the RGB color data to the engine controller 514. The engine controller 514 acquires image data of each of the RGB colors from the print controller 513 on a page-by-page basis and controls the printing section 209 to print each page. The user interface controller 515 acquires information on the status of the print job being processed from the job controller 505 and displays the processing status of the print job on the console section 207.

Figure 6:
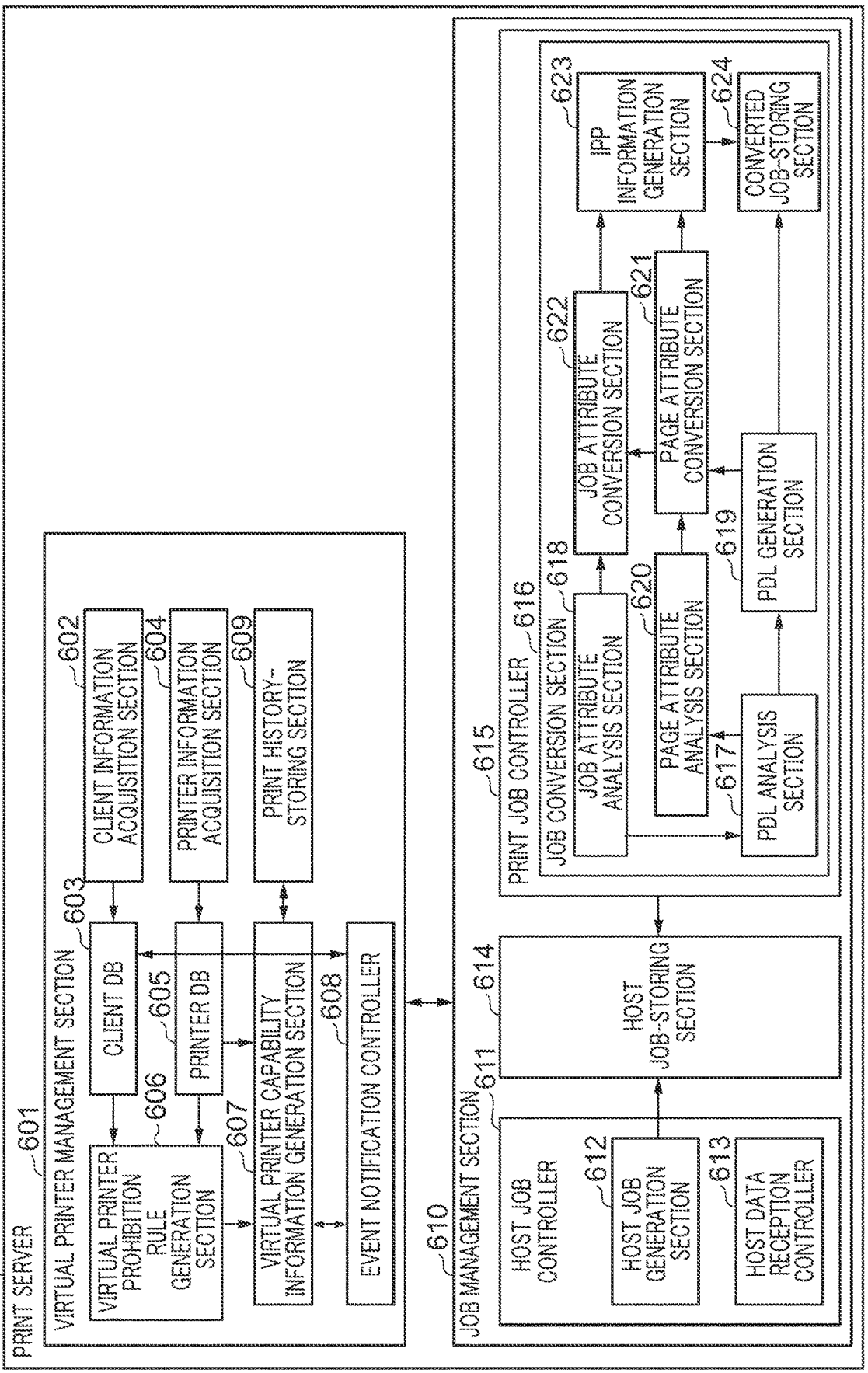
FIG. 6 is a block diagram schematically showing a software configuration of the print server appearing in FIG. 1.

FIG. 6 is a block diagram schematically showing a software configuration of the print server 105 appearing in FIG. 1. Referring to FIG. 6, the print server 105 includes, as modules, a virtual printer management section 601, a client information acquisition section 602, a printer information acquisition section 604, a virtual printer prohibition rule generation section 606, and a virtual printer capability information generation section 607 (setting unit). Further, the print server 105 includes, as modules, an event notification controller 608, a print history-storing section 609, a job management section 610, a host job controller 611, a host job generation section 612, a host data reception controller 613, and a host job-storing section 614. Furthermore, the print server 105 includes, as modules, a print job controller 615, a job conversion section 616, a PDL analysis section 617, a job attribute analysis section 618, a PDL generation section 619, a page attribute analysis section 620, a page attribute conversion section 621, a job attribute conversion section 622, an IPP information generation section 623, and a converted job-storing section 624. Processing operations of the above-mentioned modules are performed by the CPU 301 executing associated programs loaded into the RAM 303.

The virtual printer management section 601 is comprised of the client information acquisition section 602, the printer information acquisition section 604, the virtual printer prohibition rule generation section 606, the virtual printer capability information generation section 607, the event notification controller 608, and the print history-storing section 609.

The client information acquisition section 602 stores client information, received by IPP, in a client database 603. The printer information acquisition section 604 stores the capability information of the printers 101 and 103, received by IPP, in a printer database 605. The virtual printer prohibition rule generation section 606 generates prohibition rule information of the print server 105 by combining the prohibition rule information acquired from the printers 101 and 103 and the functions supported by the client. The virtual printer capability information generation section 607 generates the capability information of the virtual printer by combining not only the prohibition rule information, but also the capability information of the printers 101 and 103. For example, the virtual printer capability information generation section 607 generates the capability information of the virtual printer based on the capability information of the printers 101 and 103, which is stored in the printer database 605, and a print history database managed by the print history-storing section 609. The event notification controller 608 notifies, for example, when the virtual printer capability information generation section 607 has updated the capability information of the virtual printer, the information processing apparatus 108 of this fact. Upon receipt of the notification of the update, the information processing apparatus 108 requests the print server 105 again to transmit the capability information of the virtual printer. The print history-storing section 609 manages the print history database. In the print history database, information on printers used by the virtual printer, sheet sizes, sheet feeding directions, etc., is recorded on a user-by-user basis.

The job management section 610 is comprised of the host job controller 611, the host job-storing section 614, and the print job controller 615. The host job controller 611 is comprised of the host job generation section 612 and the host data reception controller 613. The host job controller 611 performs processing for managing print data received from the information processing apparatus 108. The host job generation section 612 separates print data received from the information processing apparatus 108 by IPP into IPP print settings data and PDL data described in a PDL language, in cooperation with the host data reception controller 613. Further, the host job generation section 612 stores the separated PDL data in the host job-storing section 614.

The print job controller 615 is formed by the job conversion section 616. The job conversion section 616 is comprised of the PDL analysis section 617, the job attribute analysis section 618, the PDL generation section 619, the page attribute analysis section 620, the page attribute conversion section 621, the job attribute conversion section 622, the IPP information generation section 623, and the converted job-storing section 624.

The print job controller 615 causes one of the printers 101 and 103, registered in the print server 105, to execute printing of stored print data. More specifically, upon receipt of a print data request e.g. from the printer 101 by IPP, the print job controller 615 compares a data format which can be processed by the printer 101 and the data format of the print data stored in the host job-storing section 614. As a result of the comparison, if the data formats are different from each other, it is determined that conversion of the data format by the job conversion section 616 is required. In this case, the PDL analysis section 617 analyzes page data based on IPP job attributes and IPP document attributes acquired from the job attribute analysis section 618. Then, the PDL generation section 619 converts the page data to a data format suitable for the printer 101. Page attributes of the new data format are created by combining the page attributes of the original data and the page attributes of the converted data. The page attributes of the original data are acquired by the page attribute analysis section 620. The page attributes of the converted data are created by the page attribute conversion section 621 through combining the old page attributes and the new page attributes. Further, the job attributes of the converted data are created by the job attribute conversion section 622 through combining the old job attributes and the new page attributes. Then, the IPP information generation section 623 converts the created job attributes and page attributes to IPP job attributes and IPP document attributes. Further, the PDL generation section 619 stores the converted page data in the converted job-storing section 624. When print data including IPP job attributes, IPP document attributes, and converted PDL data is stored in the converted job-storing section 624, the stored print data is transmitted to the printer 101 as a response to the print data request.

Figure 7:
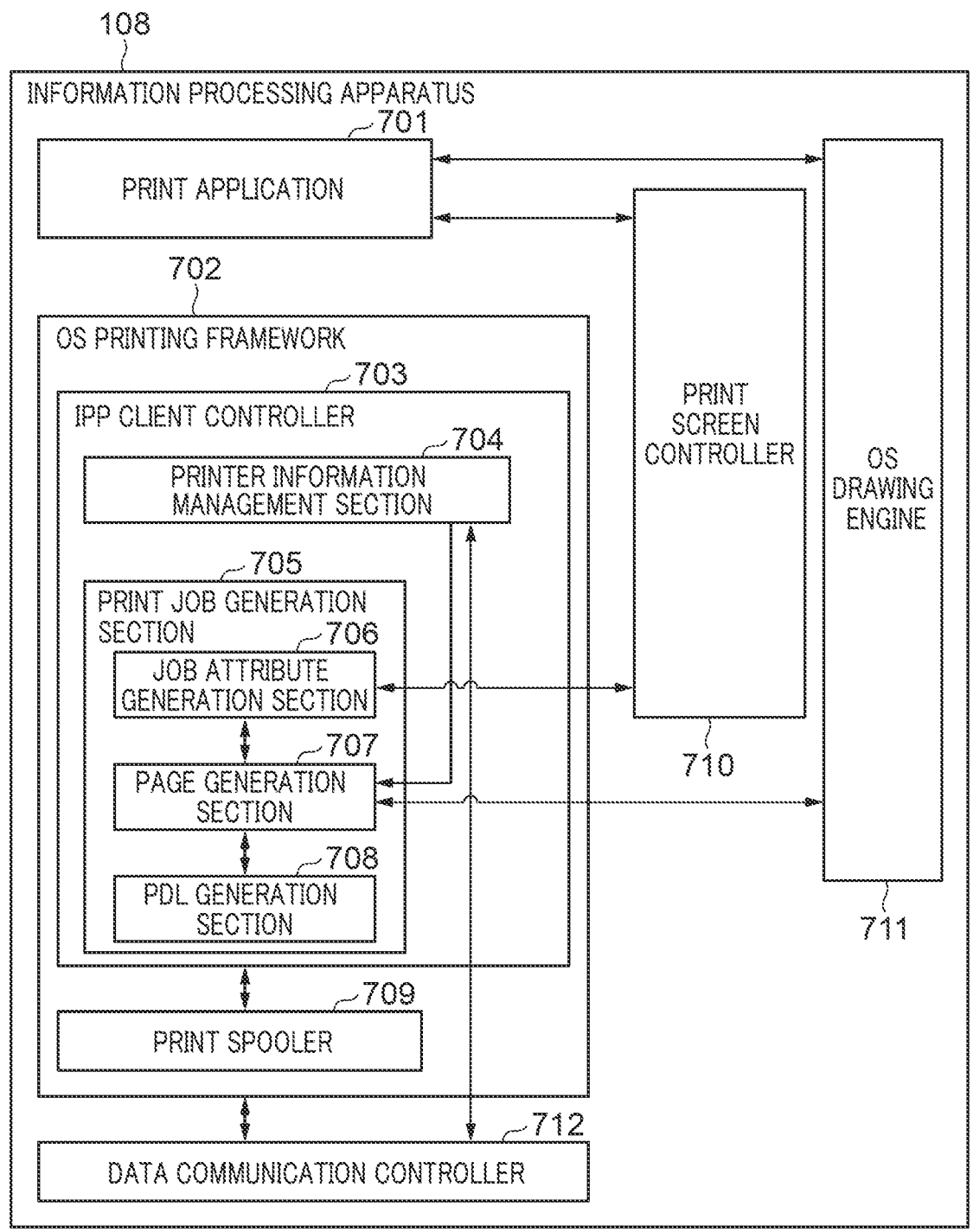
FIG. 7 is a block diagram schematically showing a software configuration of the information processing apparatus appearing in FIG. 1.

FIG. 7 is a block diagram schematically showing a software configuration of the information processing apparatus 108 appearing in FIG. 1. Referring to FIG. 7, the information processing apparatus 108 includes, as modules, a print application 701, an OS printing framework 702, an IPP client controller 703, a printer information management section 704, a print job generation section 705, and a job attribute generation section 706. Further, the information processing apparatus 108 includes, as modules, a page generation section 707, a PDL generation section 708, a print spooler 709, a print screen controller 710, an OS drawing engine 711, and a data communication controller 712. Processing operations of the above-mentioned modules are performed by the CPU 401 executing associated programs loaded into the RAM 403.

The print application 701 is an application installed in the information processing apparatus 108 by the user, for realizing the virtual print service. The OS printing framework 702 is comprised of the IPP client controller 703 and the print spooler 709. The IPP client controller 703 is comprised of the printer information management section 704 and the print job generation section 705. The printer information management section 704 sends an inquiry to the print server 105 via the data communication controller 712 and holds the capability information of the virtual printer acquired from the print server 105. The print job generation section 705 is comprised of the job attribute generation section 706, the page generation section 707, and the PDL generation section 708. The print job generation section 705 generates print data based on an instruction received from the user. The job attribute generation section 706 generates job attributes and document attributes forming the print data, based on print settings information set by the user. The page generation section 707 converts drawing data generated by the print application 701 using the OS drawing engine 711 to PDL data supported by the virtual printer, in cooperation with the PDL generation section 708, and transmits the converted PDL data to the print server 105. In doing this, the page generation section 707 acquires information on PDL formats supported by the virtual printer and a generated image orientation from the printer information management section 704 and converts the drawing data to the PDL data based on the acquired information. The print spooler 709 holds the print data formed by the converted PDL data.

The print screen controller 710 displays a print settings screen on a display section (not shown) of the information processing apparatus 108 in response to a call performed by the print application 701. The user sets print settings information from the print settings screen and gives an instruction for inputting a print job. The print settings screen displays items of settings concerning the printing function which can be provided by the virtual printer. The OS drawing engine 711 draws print page data in an OS standard drawing format according to a request from the print application 701. Further, the OS drawing engine 711 outputs the print page data to the page generation section 707. The data communication controller 712 performs communication for controlling the registered printers 101 and 103. Further, the data communication controller 712 performs data communication with the print server 105. For example, the data communication controller 712 acquire print data stored in the print spooler 709 and transmits the acquired print data to the print server 105. In the present embodiment, for example, in a case where the printers 101 and 103, registered in the print server 105, support only the PWG-Raster format, the print server 105 notifies the information processing apparatus 108 of the capability information including the information indicative of PWG-Raster. Upon receipt of this notification, the information processing apparatus 108 causes the PDL generation section 708 to generate PWG- Raster data by optimizing the data to an image orientation designated by the print server 105.

Figure 8A:
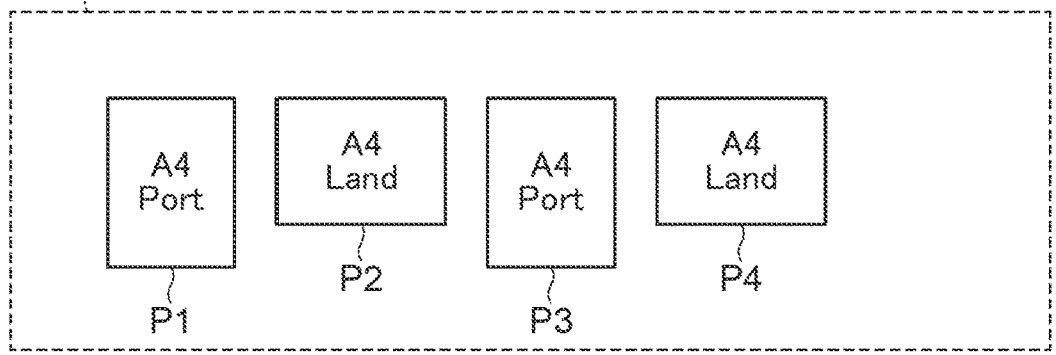
FIGS. 8A to 8D are diagrams each showing an example of original data in the PDF format, which is transferred by the information processing apparatus appearing in FIG. 1.

In the image forming system 100, in a case where the printer 101 as the transmission destination of the print data supports the PDF format, the print server 105 transfers original data 801 in the PDF format, shown in FIG. 8A, to the printer 101 without processing the data. Note that in the example illustrated in FIG. 8A, the original data 801 is formed by portrait images P1 and P3, and landscape images P2 and P4.

Figure 8B:
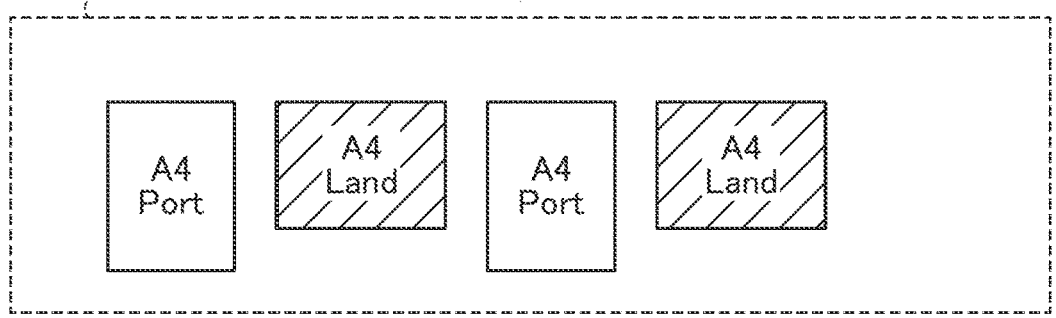
Figure 8C:
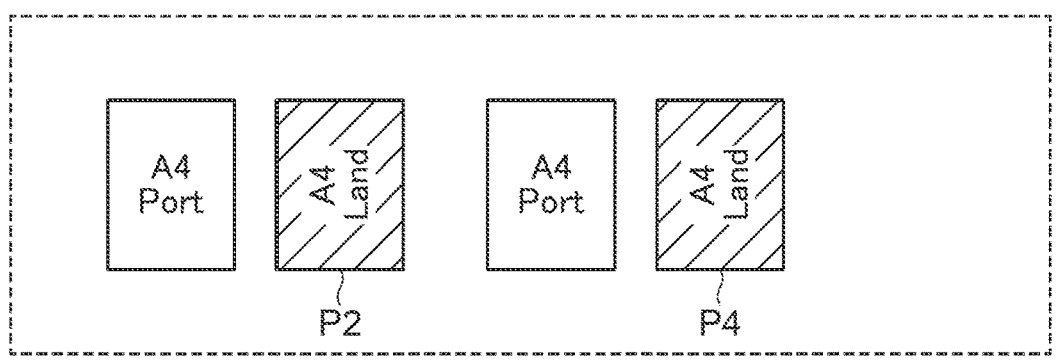
Figure 8D:
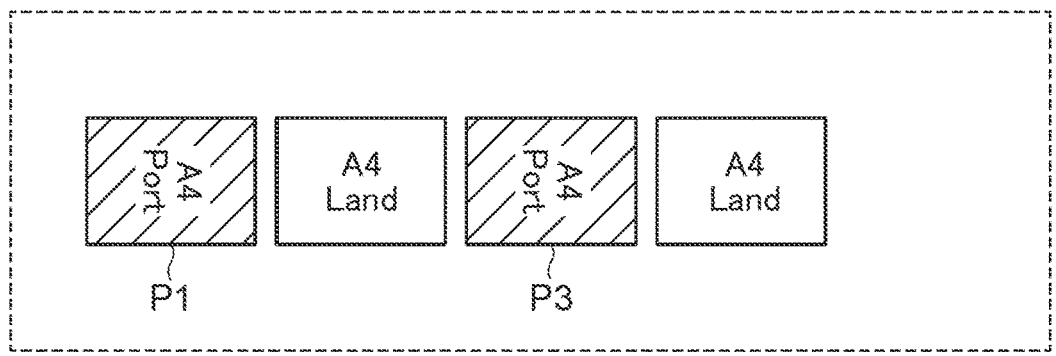

In a case where the printer 101 as the transmission destination of the print data does not support the PDF format, the print server 105 transmits original data 802, shown in FIG. 8B, obtained by converting the original data 801 to PWG-Raster data, to the printer 101. The printer 101 performs image rotation-conversion processing on the received original data 802 such that the images are generated in an orientation suitable for the sheet-feeding direction of the printer 101. For example, the printer 101 aligns the orientation of the landscape images P2 and P4 to the orientation of the portrait images P1 and P3, as shown in FIG. 8C, such that the images are generated in an orientation suitable for a short edge feed direction as a sheet-feeding direction. Alternatively, the printer 101 aligns the orientation of the portrait images P1 and P3 to the orientation of the landscape images P2 and P4, as shown in FIG. 8D, such that the images are generated in an orientation suitable for a long edge feed direction as a sheet-feeding direction.

Here, in a case where the printer 101 cannot perform image rotation-conversion processing, the print server 105 is required to perform image rotation processing on the original data 802. However, since accesses to the print server 105 are concentrated from a plurality of information processing apparatuses and other printers, if the print server 105 performs the image rotation processing, the processing load of the print server 105 is increased.

To cope with this, in the present embodiment, the capability information of the virtual printer is transmitted from the print server 105 to the information processing apparatus 108. The information processing apparatus 108 generates print data based on the received capability information of the virtual printer, and the print server 105 generates, based on the capability information of one of the printers 101 and 103, which has a predetermined record of actual use, the capability information of the virtual printer.

Figure 9A:
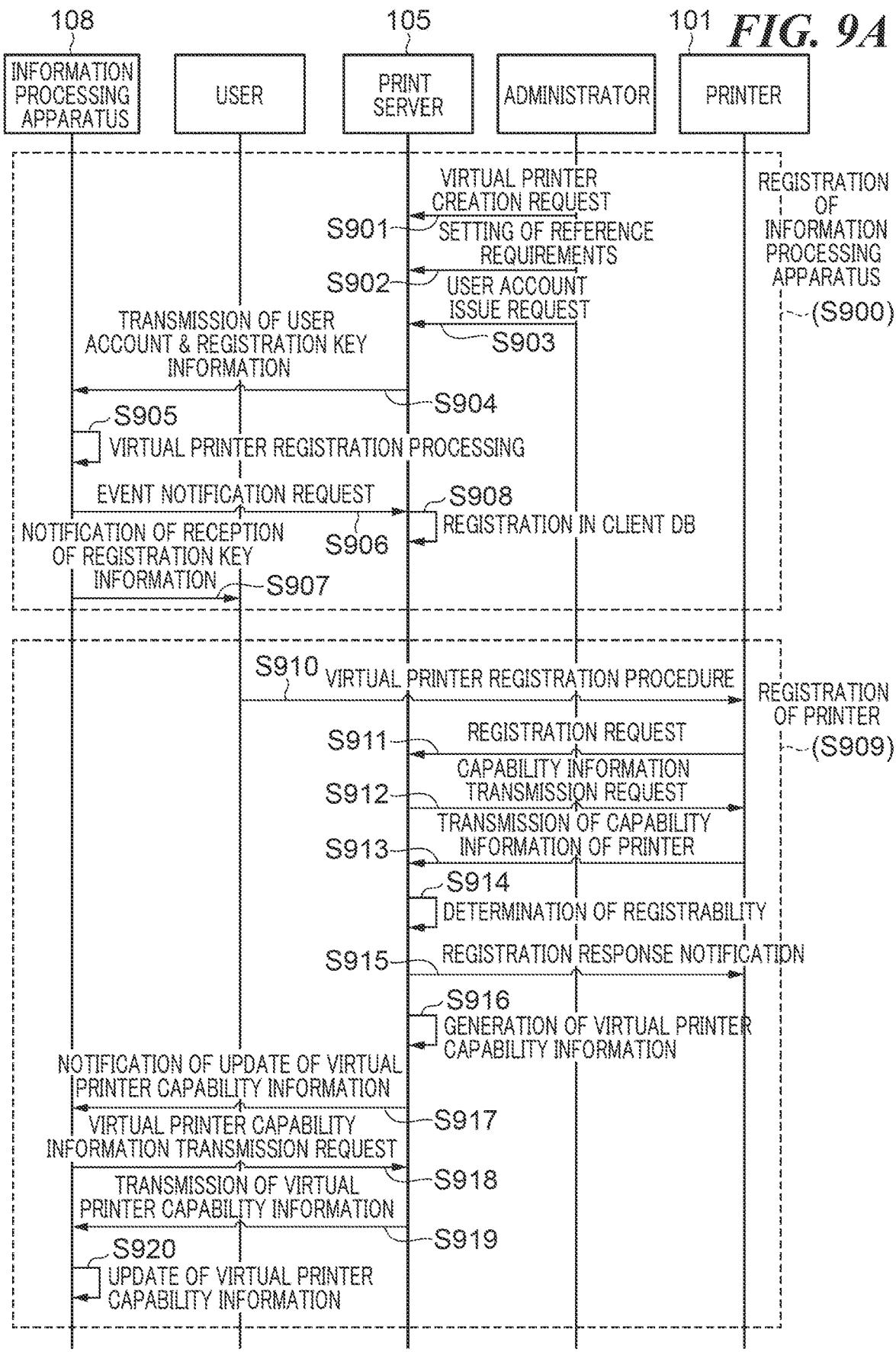
FIG. 9A is a sequence diagram of a print control process performed by the image forming system shown in FIG. 1.

FIGS. 9A and 9B are a sequence diagram of a print control process performed by the image forming system 100 shown in FIG. 1.

A step group S900 in FIG. 9A corresponds to a process for registering the information processing apparatus 108 as an apparatus constituting part of the virtual printer (hereinafter referred to as the "virtual printer constituent apparatus"). In the step group S900, steps S901 to S908 are executed. More specifically, an administrator requests the print server 105 to create a virtual printer (step S901). Further, the administrator sets reference requirements for a printer to be permitted to be registered in the virtual printer, in the print server 105 (step S902). In the step S902, the reference requirements including e.g. a requirement that a printer is capable of double-sided printing are set. Then, the administrator requests the print server 105 to issue an account of a user (hereinafter referred to as the "user account"), who is permitted to use the virtual print service (step S903). In the step S903, the administrator sets information on the information processing apparatus 108 used by the user, in the print server 105. The print server 105 having received the user account-issuing request transmits the issued user account and registration key information to the information processing apparatus 108 (step S904). The registration key information is required when registering the information processing apparatus 108 as a virtual printer constituent apparatus with the print server 105.

The information processing apparatus 108 performs processing for registering the virtual printer based on the received registration key information (step S905). Further, the information processing apparatus 108 transmits an event notification request to the print server 105 so as to receive a status notification of the virtual printer (step S906). Further, the information processing apparatus 108 notifies the user of the received registration key information (step S907). More specifically, the information processing apparatus 108 displays the registration key information on the display section of the information processing apparatus 108.

The print server 105 having received the event notification request from the information processing apparatus 108 causes the virtual printer management section 601 to register the information processing apparatus 108 in the client database 603 as an event notification target of the virtual printer (step S908). With this, the information processing apparatus 108 functions as an instruction receiving section of the virtual printer, which receives an instruction for setting print settings information, an instruction for inputting a print job, etc., given by the user.

A step group S909 in FIG. 9A corresponds to a process for registering a printer as a virtual printer constituent apparatus. Although the following description is given of a case where the printer 101 is registered as the virtual printer constituent apparatus, by way of example, it is possible to register a printer other than the printer 101 as a virtual printer constituent apparatus, by performing the same process.

In the step group S909, steps S910 to S920 are executed. More specifically, the user performs a procedure for registering the virtual printer by inputting via the console section 207 of the printer 101 the registration key information notified in the step S907 (step S910). The printer 101 to which the registration key information has been input transmits a registration request to the print server 105, using the IPP-Proxy controller 501 (step S911). The print server 105 having received the registration request requests the printer 101 to transmit the capability information (step S912). The printer 101 having received the capability information transmission request transmits the capability information of the printer 101 to the print server 105 (step S913). As the capability information of the printer 101, the printer 101 transmits e.g. sheet feeding-related information 1001 shown in FIG. 10A to the print server 105. In the sheet feeding-related information 1001, the sheet-feeding direction and information on executability of the image rotation-conversion processing of the printer 101 are set for each sheet size. Note that in the present embodiment, in a case where the printer 103 is registered as a virtual printer constituent apparatus, the printer 103 transmits sheet feeding-related information 1002 shown in FIG. 10B to the print server 105 as the capability information of the printer 103. In the sheet feeding-related information 1002, the sheet-feeding direction and information on executability of the image rotation-conversion processing of the printer 103 are set for each sheet size.

The print server 105 having received the capability information of the printer 101 determines whether or not the printer 101 can be registered (step S914). Specifically, in the step S914, the print server 105 determines based on the received capability information of the printer 101 whether or not the printer 101 satisfies the reference requirements set in the step S902. Then, the print server 105 notifies the printer 101 of a registration response based on a result of the determination in the step S914 (step S915). In the step S915, for example, if the printer 101 does not satisfy the reference requirements, the print server 105 transmits a notification that registration has failed, to the printer 101. On the other hand, if the printer 101 satisfies the reference requirements, the print server 105 transmits a notification that registration is permitted, to the printer 101. Further, the print server 105 generates the capability information of the virtual printer based on the capability information of the printer 101 (step S916). After that, the print server 105 transmits a notification of the update of the capability information of the virtual printer to the information processing apparatus 108 registered in the client database 603 (step S917).

The information processing apparatus 108 having received the notification of the update requests the print server 105 to transmit the capability information of the virtual printer (step S918). As the request for transmitting the capability information of the virtual printer, for example, the information processing apparatus 108 transmits data 1101 shown in FIG. 11A to the print server 105. The data 1101 includes e.g. a command 1102 for requesting information on the sheet-feeding direction of the virtual printer. Upon receipt of the request for transmitting the capability information of the virtual printer, the print server 105 transmits the capability information of the virtual printer to the information processing apparatus 108 (step S919). In the step S919, the print server 105 transmits data 1103 shown in FIG. 11B including the capability information of the virtual printer to the information processing apparatus 108. The data 1103 includes e.g. a command 1104 concerning the sheet-feeding direction of the virtual printer. The illustrated example in FIG. 11B shows that the sheet-feeding direction for A4 and A5 sizes is set to long edge feed, and the sheet-feeding direction for the other sheet sizes is set to short edge feed. The information processing apparatus 108 having received the capability information of the virtual printer updates the capability information of the virtual printer held by the printer information management section 704 (step S920). With this, the printer 101 functions as the printing section of the virtual printer, which performs printing.

A step group S921 in FIG. 9B corresponds to a process from inputting of a print job to the virtual printer to execution of pull printing. In the step S921, steps S922 to S935 are executed. More specifically, the user sets the print settings information on the print settings screen (not shown) displayed by starting the print application 701 installed in the information processing apparatus 108, and provides an instruction for inputting a print job (step S922). The information processing apparatus 108 generates print data for executing the print job corresponding to the input instruction and transmits the generated print data to the print server 105 (step S923). The print server 105 stores the received print data (step S924). Then, the user logs into the printer 101 installed in the vicinity of the user (step S925), and gives a pull-print instruction from the console section 207 of the printer 101 (step S926).

The printer 101 having received the pull-print instruction transmits a job list request to the print server 105 (step S927). The print server 105 having received the job list request searches for jobs corresponding to the job list request (step S928). Specifically, the print server 105 searches for jobs input by the user and corresponding to the print data stored therein. Then, the print server 105 transmits a job list as listed information of retrieved jobs to the printer 101 (step S929). The printer 101 displays the received job list on the console section 207. When one print job is selected from the job list by the user (step S930), the printer 101 requests the print server 105 to transmit print data corresponding to the selected print job (step S931).

The print server 105 converts the print data corresponding to the received transmission request so as to adapt the print data to the printer 101 (step S932). For example, in a case where the data format of the print data is not a data format supported by the printer 101, the print server 105 converts the data format of the print data to the data format supported by the printer 101. The print server 105 transmits the converted print data to the printer 101 (step S933). The printer 101 performs the print processing based on the received print data (step S934), and when the print processing is completed, the printer 101 transmits a completion notification indicating completion of the print processing to the print server 105 (step S935).

A step group S936 in FIG. 9B corresponds to a process for updating the capability information of the virtual printer after execution of the print processing. In the step group S936, steps S937 to S942 are executed.

The print server 105 updates the print history database managed by the print history-storing section 609 after execution of the step S932 (step S937). The print history database includes print record information 1201 shown in FIG. 12A and printer use record information 1202 shown in FIG. 12B. The print record information 1201 manages information on the number of times of actual printing for each set of print conditions and the immediately preceding use situation of the virtual printer. The print conditions include a type of the printer, a sheet size, a sheet type, a sheet-feeding direction, and a user using the printer. The printer use record information 1202 manages information on the number of times of actual use of the virtual printer for each set of use conditions and the immediately preceding use situation. The use conditions include a type of the printer and a user using the printer. In the step S937, the print server 105 updates these items of information. Then, the print server 105 updates the capability information of the virtual printer based on the updated print history database (step S938). For example, the print server 105 updates the sheet-feeding direction of the virtual printer, included in the capability information of the virtual printer, to the sheet-feeding direction of the printer used in the immediately preceding printing. After that, the print server 105 causes the event notification controller 608 to transmit a notification of the update of the capability information of the virtual printer to the information processing apparatus 108 registered in the client database 603 (step S939). The information processing apparatus 108 having received the notification of the update requests the print server 105 to transmit the capability information of the virtual printer (step S940). As the request for transmitting the capability information of the virtual printer, the information processing apparatus 108 transmits e.g. data 1301 shown in FIG. 13A to the print server 105. The data 1301 includes e.g. a command 1302 for requesting information on the sheet-feeding direction of the virtual printer.

The print server 105 transmits the capability information of the virtual printer to the information processing apparatus 108 as a response to the received transmission request (step S941). In the step S941, the print server 105 transmits data 1303 shown in FIG. 13B including the capability information of the virtual printer to the information processing apparatus 108. The data 1303 includes e.g. a command 1304 concerning the sheet-feeding direction of the virtual printer. Upon receipt of the capability information of the virtual printer, the information processing apparatus 108 updates the capability information of the virtual printer held by the printer information management section 704 thereof (step S942). After that, for example, when a print job input instruction is received from the same user, the information processing apparatus 108 generates print data to generate an image in an orientation suitable for the sheet-feeding direction of the printer used in the immediately preceding printing, based on the updated capability information of the virtual printer.

Figure 14:
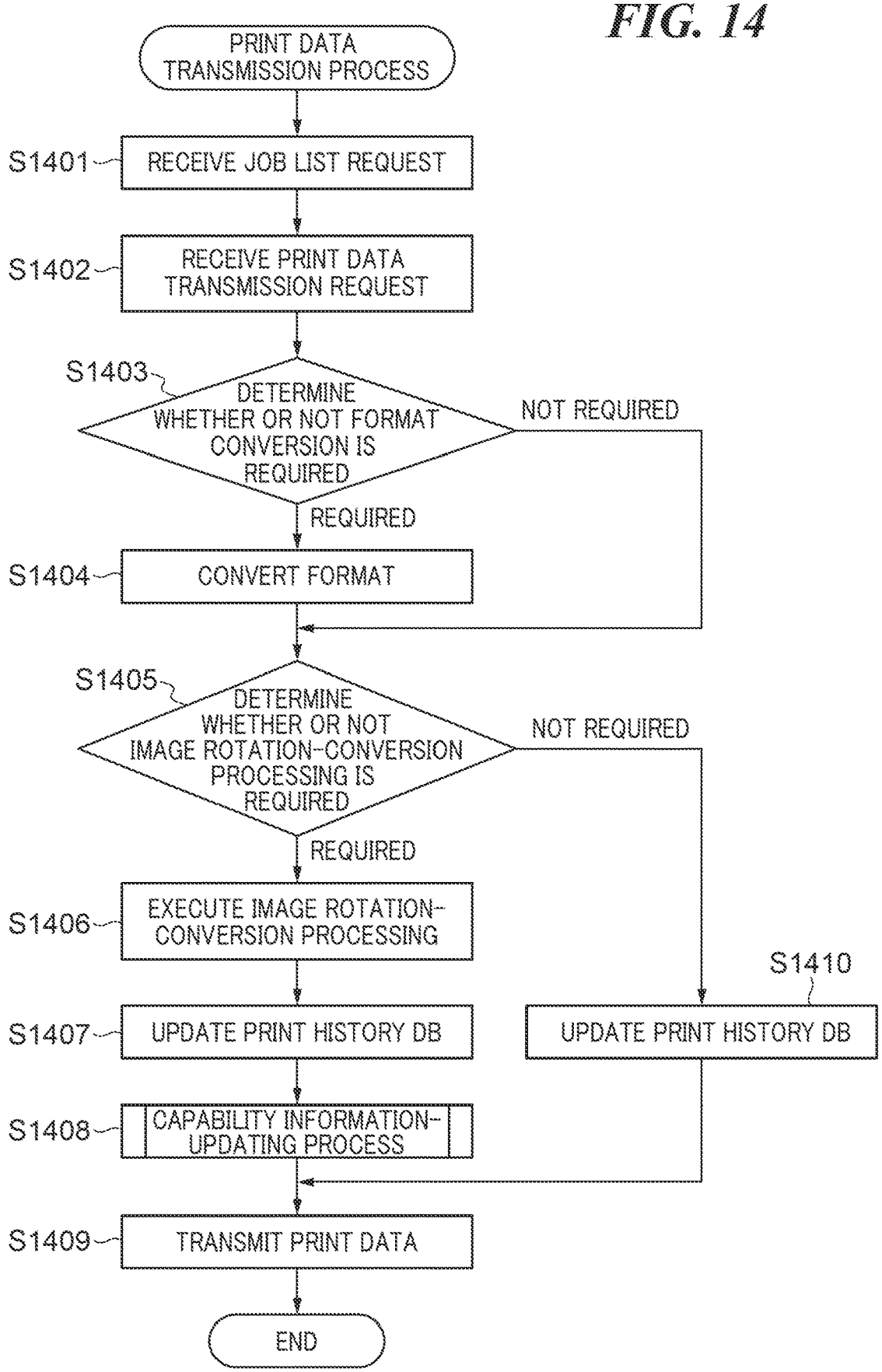
FIG. 14 is a flowchart of a print data transmission process performed by the print server appearing in FIG. 1.

FIG. 14 is a flowchart of a print data transmission process performed by the print server 105, appearing in FIG. 1. The process in FIG. 14 is performed by the CPU 301 executing an associated program stored in the ROM 302.

Referring to FIG. 14, upon receipt of a job list request from the printing section of the virtual printer, e.g. the printer 101 (step S1401) (see e.g. the step S927), the CPU 301 of the print server 105 transmits the job list corresponding to the job list request to the printer 101 (see e.g. the step S929). Then, when a request for transmitting print data corresponding to a print job selected from the job list by the user is received from the printer 101 (step S1402) (see e.g. step S931), the CPU 301 determines whether or not it is required to perform conversion of the data format of the print data (step S1403). In the step S1403, for example, if the data format of the print data is a data format supported by the printer 101, the CPU 301 determines that it is not required to perform conversion of the data format. On the other hand, if the data format of the print data is not a data format supported by the printer 101, the CPU 301 determines that it is required to perform conversion of the data format.

If it is determined in the step S1403 that it is not required to perform conversion of the data format, the CPU 301 executes a step S1405, described hereinafter. If it is determined in the step S1403 that it is required to perform conversion of the data format, the CPU 301 causes the job conversion section 616 to convert the data format of the print data (step S1404) (see e.g. the step S932). Then, the CPU 301 determines whether or not it is required to perform image rotation-conversion processing on the print data for converting the orientation of a generated image (step S1405). In the step S1405, for example, in a case where the printer 101 is equipped with an image rotation function for rotating the orientation of a generated image, or in a case where the orientation of a generated image, which is set to the print data, is an orientation suitable for the sheet-feeding direction of the printer 101, the CPU 301 determines that it is not required to perform the image rotation-conversion processing. On the other hand, in a case where the printer 101 is not equipped with the image rotation function, and also the orientation of a generated image, which is set to the print data, is not an orientation suitable for the sheet-feeding direction of the printer 101, the CPU 301 determines that it is required to perform the image rotation-conversion processing.

If it is determined in the step S1405 that it is required to perform the image rotation-conversion processing, the CPU 301 performs the image rotation-conversion processing on the print data (step S1406) (see e.g. the step S932). Then, the CPU 301 updates the print history database managed by the print history-storing section 609 (step S1407) (see e.g. the step S937). Then, the CPU 301 performs a capability information-updating process, described hereinafter with reference to FIG. 15 (step S1408) to update the capability information of the virtual printer, and transmit a notification of the update of the capability information of the virtual printer to the information processing apparatus 108. Further, upon receipt of the request for transmitting the capability information of the virtual printer from the information processing apparatus 108, the CPU 301 transmits the capability information of the virtual printer to the information processing apparatus 108 (see e.g. the steps S940 and S941). That is, in the present embodiment, in a case where it is required to perform the image rotation-conversion processing, the CPU 301 transmits the capability information of the virtual printer to the information processing apparatus 108. Then, the CPU 301 transmits the print data to the printer 101 (step S1409), followed by terminating the present process.

If it is determined in the step S1405 that it is not required to perform the image rotation-conversion processing, the CPU 301 updates the print history database managed by the print history-storing section 609 (step S1410), and executes the step S1409 et seq.

Figure 15:
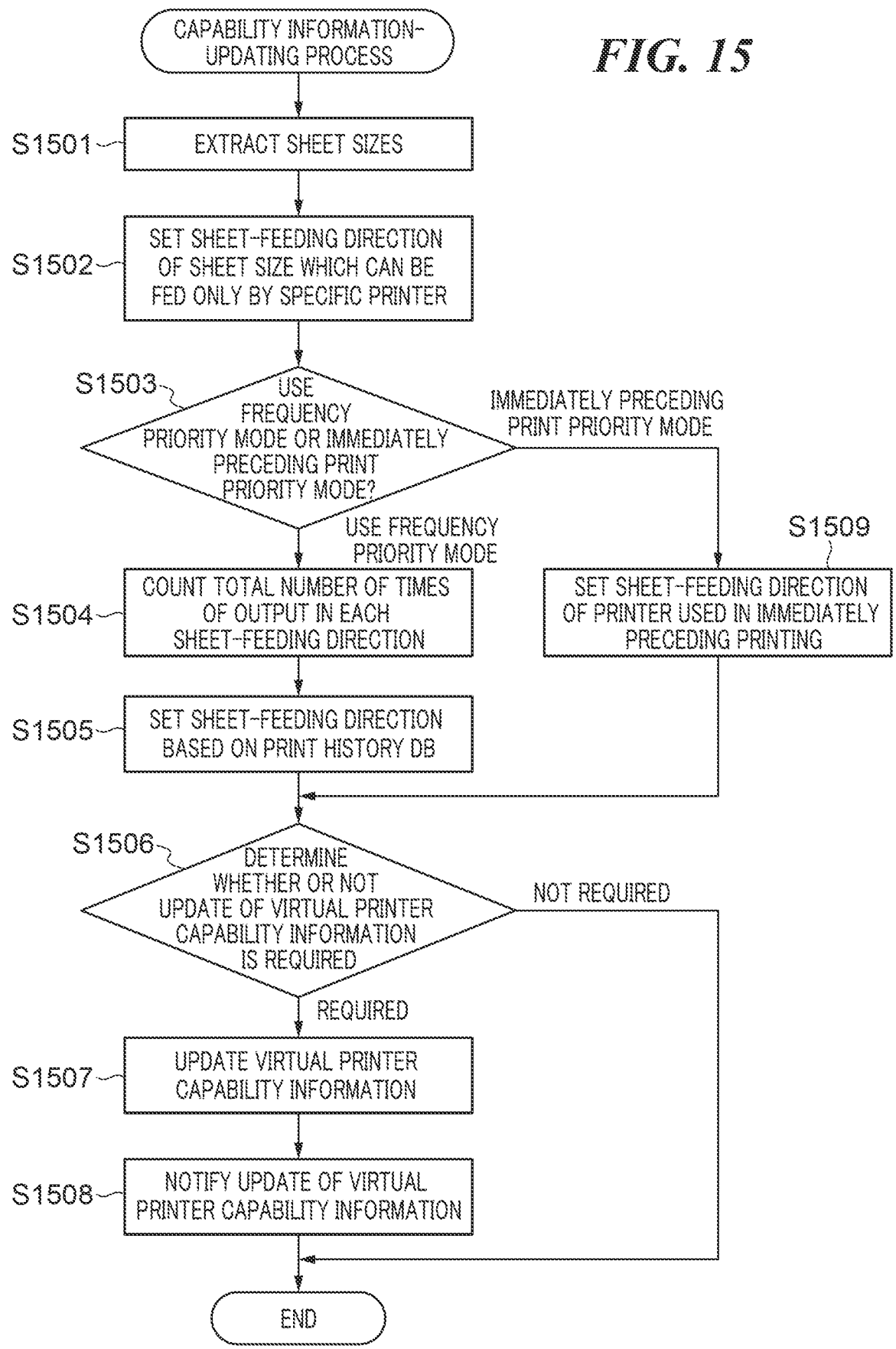
FIG. 15 is a flowchart of a capability information-updating process in a step in FIG. 14.

FIG. 15 is a flowchart of the capability information-updating process in the step S1408 in FIG. 14. In the process in FIG. 15, the sheet-feeding direction of the virtual printer set for each sheet size and included in the capability information of the virtual printer is updated. Note that in the process in FIG. 15, it is assumed that one of a use frequency priority mode and an immediately preceding print priority mode has been set by an administrator in advance. In a case where the use frequency priority mode has been set, the print server 105 updates the sheet-feeding direction of the virtual printer included in the capability information of the virtual printer based on the print history database. On the other hand, in a case where the immediately preceding print priority mode has been set, the print server 105 updates the sheet-feeding direction of the virtual printer included in the capability information of the virtual printer to the sheet-feeding direction of the printer used in the immediately preceding printing.

Referring to FIG. 15, the CPU 301 causes the virtual printer capability generation section 607 to extract all sheet sizes supported by each of printers as virtual printer constituent apparatuses not equipped with the image rotation function (step S1501) (see e.g. a table 1601 shown in FIG. 16A). Then, the CPU 301 sets sheet-feeding directions of sheet sizes out of the extracted sheet sizes, which can be fed only by a specific printer of the virtual printer constituent apparatuses (step S1502). For example, the CPU 301 sets the sheet-feeding directions of the sheet sizes of "A3", "A6", "postcard", and "envelope", out of the extracted sheet sizes, which can be fed by the specific printer, based on the capability information of the specific printer (see e.g. a table 1602 shown in FIG. 16B). Then, the CPU 301 determines which of the use frequency priority mode and the immediately preceding print priority mode has been set (step S1503).

If it is determined in the step S1503 that the use frequency priority mode has been set, the CPU 301 counts a total number of times of output in each sheet-feeding direction based on the print history database with respect to a sheet size, out of the extracted sheet sizes, for which the sheet-feeding direction is not set (step S1504). In the step S1504, for example, the respective total numbers of times of output in the directions of long edge feed and short edge feed are counted based on the numbers of times of actual printing included in the print record information 1201 shown in FIG. 12A, with respect to "A4" for which the sheet-feeding direction is not set. In the example of the print record information 1201, the total number of times of output in the direction of long edge feed with respect to "A4" is 30, and the total number of times of output in the direction of short edge feed with respect to "A4" is 360. That is, in this example, the total number of times of output with respect to "A4" is larger in the direction of short edge feed than in the direction of long edge feed. Then, the CPU 301 sets, based on the print history database, the sheet-feeding direction of the sheet size for which the sheet-feeding direction is not set (step S1505). In the step S1505, for example, the CPU 301 sets the sheet-feeding direction of "A4", for which the sheet-feeding direction is not set, to short edge feed which is the largest in the total number of times of output (see e.g. a table 1603 shown in FIG. 16C). Further, the sheet-feeding direction of "A5" having no record of actual printing is set based on the capability information of the printer 103 which is the largest in the number of times of actual use in the printer use record information 1202. Then, the CPU 301 determines whether or not it is required to update the capability information of the virtual printer (step S1506).

If it is determined in the step S1506 that it is required to update the capability information of the virtual printer, the CPU 301 updates the capability information of the virtual printer (step S1507) (see e.g. the step S938). Then, the CPU 301 transmits a notification of the update of the capability information of the virtual printer to the information processing apparatus 108 registered in the client database 603 (step S1508) (see e.g. the step S939), followed by terminating the present process. If it is determined in the step S1506 that it is not required to update the capability information of the virtual printer, the CPU 301 immediately terminates the present process.

If it is determined in the step S1503 that the immediately preceding print priority mode has been set, the CPU 301 sets the sheet feeding direction of a sheet size for which the sheet-feeding direction is not set, to the sheet-feeding direction of a printer used in the immediately preceding printing (step S1509) (see e.g. a table 1604 shown in FIG. 16D). Then, the CPU 301 executes the step S1506 et seq. In the above-described embodiment, the description is given as to the sheet-feeding direction of a sheet, by way of example. However, the capability information is not limited to information on the sheet-feeding direction of a sheet, but it may be information on any other setting, such as a setting indicating whether or not the image forming apparatus is capable of receiving PDF data and a setting of a resolution of image data input to the image forming apparatus.

According to the above-described embodiment, the capability information of the virtual printer is transmitted from the print server 105 to the information processing apparatus 108. The information processing apparatus generates print data based on the received capability information of the virtual printer, and the capability information of the virtual printer is generated based on the capability information of one of the printers 101 and 103, which has a predetermined record of actual use. That is, the print data is generated based on the capability information of the virtual printer on which the use tendency of a user is reflected. This makes it possible to generate print data according to the use tendency of a user, whereby it is possible to reduce a situation in which the print server 105 is required to perform the image-rotation conversion processing on the print data. As a result, it is possible to reduce the processing load of the print server 105.

Further, in the above-described embodiment, the capability information of the virtual printer is generated based on the capability information of one of the printers 101 and 103, which is the largest in use frequency. With this, in a case where a user uses the same printer a plurality of times, it is possible to reduce a situation in which the print server 105 is required to perform the image rotation-conversion processing on the print data.

Furthermore, in the above-described embodiment, the capability information of the virtual printer is generated based on the capability information of one of the printers 101 and 103, which is used in the immediately preceding printing. With this, in a case where a user uses the printer used in the immediately preceding printing again, it is possible to reduce a situation in which the print server 105 is required to perform the image rotation conversion processing on the print data.

In the above-described embodiment, the record of actual use of the printers 101 and 103 is managed on a user-by-user basis. This makes it possible to generate print data according to the use tendency of each user, whereby even when any user uses the virtual printer, it is possible to reduce the processing load of the print server 105.

Further, in the above-described embodiment, the capability information includes information on the sheet-feeding directions of the printers 101 and 103. This makes it possible to generate print data for forming an image in a proper orientation matching the use tendency of a user without increasing the processing load of the print server 105.

Further, in the above-described embodiment, in a case where it is required to execute the image rotation conversion processing on print data, the capability information of the virtual printer is transmitted from the print server 105 to the information processing apparatus 108. Further, in a case where it is not required to execute the image rotation conversion processing on print data, the capability information of the virtual printer is not transmitted from the print server 105 to the information processing apparatus 108. This makes it possible to suppress increase of the processing load of the print server 105, caused by unnecessary transmission of the capability information of the virtual printer by the print server 105.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-200949 filed Oct. 25, 2018, which is hereby incorporated by reference herein in its entirety.

What is claimed is:

1. A server system that is capable of receiving print data from an information processing apparatus and transmitting the print data to one of a plurality of printing apparatuses, the server system comprising:
    an acquisition unit configured to acquire print capabilities from the plurality of printing apparatuses;
    a storing unit configured to store information regarding the one of the plurality of printing apparatuses to which the print data was transmitted;
    a determination unit configured to determine a print capability from among the acquired print capabilities based on the stored information; and
    a transmission unit configured to transmit the determined print capability to the information processing apparatus.

2. The server system according to claim 1, wherein the print capability includes information indicating whether a sheet is conveyed with a short side of the sheet at a leading end thereof or with a long side of the sheet at the leading end thereof.

3. The server system according to claim 1, wherein the print capability transmitted to the information processing apparatus is to be used by the information processing apparatus to generate another print data.

4. The server system according to claim 1, further comprising a receiving unit configured to receive a request for a print capability from the information processing apparatus, wherein the transmitting unit transmits the determined print capability in response to the received request.

5. The server system according to claim 4, wherein the received request is a request necessary to generate another print data which is different from the print data.

6. The server system according to claim 1, wherein the determination unit determines the print capability to be transmitted to the information processing apparatus, wherein the print capability is a print capability at the one of the plurality of printing apparatuses to which the print data was transmitted.

7. The server system according to claim 6, wherein the one of the plurality of printing apparatuses is a printing apparatus to which the server system transmitted the print data list.

8. The server system according to claim 1, wherein
    the storing unit stores a print setting regarding the print data which was transmitted to the one of the plurality of printing apparatuses, and
    the determination unit determines, based on the stored print setting, the print capability to be transmitted to the information printing apparatus.

9. The server system according to claim 8, wherein
    the storing unit stores the print setting and the number of times of the transmission of the print data which is set the print setting, and
    the determination unit determines the print capability based on the stored number of times.

10. The server system according to claim 1, wherein the storing unit stores the information while associating the information with a user name of the information processing apparatus.

11. The server system according to claim 10, wherein the determination unit determines the information, based on a user name of a user who instructed printing of the print data.

12. A method of controlling a server system that is capable of receiving print data from an information processing apparatus and transmitting the print data to one of a plurality of printing apparatuses, comprising:
    acquiring print capabilities from the plurality of printing apparatuses;
    storing information regarding the one of the plurality of printing apparatuses to which the print data was transmitted;
    determining a print capability from among the acquired print capabilities based on the stored information; and
    transmitting the determined print capability to the information processing apparatus.

13. A non-transitory computer-readable storage medium storing a computer-executable program for executing a method of controlling a server system that is capable of receiving print data from an information processing apparatus and transmitting the print data to one of a plurality of printing apparatuses, the method comprising:
    acquiring print capabilities from the plurality of printing apparatuses;
    storing information regarding the one of the plurality of printing apparatuses to which the print data was transmitted;
    determining a print capability from among the acquired print capabilities based on the stored information; and
    transmitting the determined print capability to the information processing apparatus.

* * * * *